United States Patent Office 3,480,575
Patented Nov. 25, 1969

3,480,575
PROCESS FOR PRODUCING MONOCARBOXYLIC ACID MODIFIED ALKYD RESINS
Carlton E. Coats, Savage, Minn., assignor to Ashland Oil & Refining Company, Ashland, Ky., a corporation of Kentucky
No Drawing. Filed Mar. 30, 1967, Ser. No. 626,972
Int. Cl. C08g 17/16
U.S. Cl. 260—22      3 Claims

ABSTRACT OF THE DISCLOSURE

A process for producing a monocarboxylic acid- modified alkyd resin composition comprising the steps of:
(I) contacting at 350° F. to 550° F. at 50 to 300 p.s.i.g. in the presence of water of reaction a reaction mixture comprising:
   (A) an aryl polycarboxylic acid,
   (B) a monocarboxylic acid of 7 to 22 carbon atoms, and
   (C) a polyhydric alcohol wherein the weight ratio of $A:B$ is from 5:1 to 1:20 and wherein C is present in an amount substantially stoichiometrically equivalent to A and B and wherein at least a portion of C consists of a polyhydric alcohol having more than 2 hydroxyl groups, to esterify the reaction mixture, and then
(II) further esterifying the reaction mixture to produce a monocarboxylic acid-modified alkyd resin.

The resin compositions produced by this process are useful as coating compositions for a wide variety of substrates and as paint substitutes.

---

This invention relates to a novel process for producing alkyd resins. It is particularly useful for producing alkyd resins of high acid numbers which can be neutralized to form water dispersible alkyd resins.

The alkyd resins comprise one of the most versatile groups of synthetic resins known. Because of their versatility they have been adapted to the production of a wide variety of coatings. Consequently in recent years they have been used in the paint field in a greater volume than any other single class of resins. Certain types of alkyd resins have found a very wide consumer acceptance because of the water dispersibility of the uncured resin which facilitates the cleaning of equipment and the correction of mistakes.

One widely used prior art process for producing alkyd resins consists of forming a reaction mixture of an aryl polycarboxylic acid, a polyhydric alcohol and a monocarboxylic acid and heating the reaction mixture at atmospheric pressure and at esterification temperatures. The initial reaction mixture is cloudy but eventually becomes clear during the course of the reaction. The progress of the reaction can be followed by viscosity measurements and acid number determinations since the viscosity increases and the acid number decreases as the reaction proceeds. The acid number, a value well-known in the alkyd resin art, is defined as the number of milligrams of potassium hydroxide required to neutralize the acidity of 1 g. of the non-volatile content of the alkyd reaction mixture. Since the acid number is based on the non-volatile portion of the reaction mixture its value is independent of the volatiles present. The acid number is a well-known function of the number of unreacted carboxylic acid groups present in the reaction mixture. See Patton, T. C., Alkyd Resin Technology-Formulating Techniques and Allied Calculation, Interscience, N.Y. (1962), and especially pages 10–13 thereof. The initial reaction mixture is cloudy and has a very high acid number of between about 100 and 500, due to the presence of large numbers of unreacted carboxylic acid groups supplied by the polycarboxylic acid and the monocarboxylic acid. As the reaction proceeds, more and more of these carboxylic acid groups react with hydroxyl groups supplied by the polyhydric alcohol with a consequent reduction in the number of unreacted carboxylic acid groups and a corresponding reduction of the acid number.

Two types of resins can be produced by the above described process. The types can be termed a conventional alkyd resin and a water dispersible alkyd resin. If the alkyd resin is destined to be rendered water dispersible it is desirable to terminate the reaction when the reaction mixture is clear and has an acid number of at least 40 and preferably from 50 to 80. This high an acid number is desirable in order to ensure the presence of sufficient unreacted carboxylic acid groups on the alkyd resin molecule to provide sites for subsequent neutralization. Neutralization renders the resin water dispersible as described more fully below. Clarity of the resin is desirable in order that the resin will cure to a transparent coating permitting one to see the underlying substrate. Furthermore cloudiness is characteristic of the presence of unreacted polycarboxylic acid. This unreacted polycarboxylic acid tends to form crystals in the cured coating which are undesirable since they become focal points for chemical attack with subsequent degradation of the cured coating. The above described prior art processes have in general been unable to produce clear alkyd resins having high acid numbers of 50 to 100.

In addition the prior art processes are plagued with a number of processing difficulties. The most reliable and most widely used analytical process control procedures depend upon the presence of a clear, compatible mixture in order to give reliable results. The cloudy, incompatible mixture tends to separate into two phases giving erroneous readings of such process control variables as viscosity and acid number. Furthermore aryl polycarboxylic acids tend to sublime at the esterification temperatures normally employed resulting in losses of unreacted acid which increases the production costs of the alkyd resin. The sublimed acid vapors recondense creating equipment maintenance problems, health and safety hazards.

It is therefore an object of the present invention to provide a novel alkyd-resin-producing-process which is free of the disadvantages of the prior art processes. Another object of the present invention is to provide a process for producing clear, compatible alkyd resins of high acid number. Still another object of the present invention is to provide a novel process for producing alkyd resins of lower acid number which are clear and compatible at high acid numbers thus facilitating process control. A still further object of the present invention is to provide a novel process for producing alkyd resins in which the sublimation of aryl polycarboxylic acid is eliminated. Still further objects and advantages of the present invention will be apparent by reference to the following detailed description thereof.

It has now been discovered that clear, compatible, high acid number, monocarboxylic acid modified alkyd resins can be produced by a process comprising the steps of:

Step I.—Contacting at 350° F. to 550° F. at 50 to 300 p.s.i.g. in the presence of water of reaction a reaction mixture comprising:

(A) an aryl polycarboxylic acid,
(B) a monocarboxylic acid of 7 to 22 carbon atoms, and
(C) a polyhydric alcohol wherein the weight ratio of $A:B$ is from 5:1 to 1:20 and wherein C is present in an amount substantially stoichiometrically equivalent to A and B and wherein at least a portion of C consists of a polyhydric alcohol having more than 2 hydroxyl groups, to esterify the reaction mixture, and then Step II.—Further esterifying the reaction mixture to produce a monocarboxylic acid-modified alkyd resin.

While it is not desired to limit this invention to any theory the following is offered by way of explanation. The initial reaction mixture consists of unreacted aryl polycarboxylic acid, unreacted polyhydric alcohol and unreacted monocarboxylic acid. While the polyhydric alcohol and the monocarboxylic acid are compatible with one another and form a clear mixture, the unreacted aryl polycarboxylic acid is insoluble in this mixture and renders the initial reaction mixture cloudy and incompatible. During Step I of the process the unreacted aryl polycarboxylic acid is first converted to the monoester and the monoester is then converted to the diester. Since the unreacted aryl polycarboxylic acid is soluble in the monoester but insoluble in the diester, the compatibility of the reaction mixture depends on the presence of a quantity of the monoester sufficient to dissolve the unreacted aryl polycarboxylic acid. In the prior art processes wherein the reaction is conducted at atmospheric pressure with continuous removal of the water of reaction the monoester reacts with the polyol to form the diester faster than the unreacted aryl polycarboxylic acid reacts with the polyol to form the monoester with the result that the reaction mixture contains a major amount of the diester in which the aryl polycarboxylic acid is insoluble. Contrary to the prior art by the two step process of the present invention the reaction mixture is maintained in Step I at the specified superatmospheric pressures and superambient temperatures in the presence of water of reaction. Under these conditions the reaction of the aryl polycarboxylic acid with the polyol to form the monoester, in which the unreacted aryl polycarboxylic acid is soluble, is favored. In Step II of the process of the present invention the components of the reaction mixture are esterified further to produce a monocarboxylic acid-modified alkyd resin. This step of further esterifying the reaction mixture is conducted by removing the water of reaction at a rate substantially equal to the rate at which it is produced. The water of reaction is preferably removed by reducing the pressure to atmospheric and continuing the esterification at atmospheric pressure and at esterification temperatures and generally from 220° F. to 600° F., and preferably from 350° F. to 450° F. It is generally preferable to cool the reaction mixture before reducing the pressure in order to minimize foaming due to the evolution of water vapor. In general it is sufficient to cool the reaction mixture to below about 250° F. As the esterification proceeds reducing the amount of unreacted aryl polycarboxylic acid the reaction mixture becomes clear and compatible sooner (at a higher acid number) than heretofore possible. Furthermore since the reaction is carried out under pressure in a closed vessel sublimation of the unreacted aryl polycarboxylic acid is eliminated.

The aryl polycarboxylic acids which can be employed in the present invention include among others phthalic acid, isophthalic acid, terephthalic acid, and trimellitic anhydride. While the above mentioned compatibility problems are attendant with the use of all aryl polycarboxylic acids this problem can be solved in the case of phthalic acid by the use of the acid anhydride in place of the acid. Phthalic anhydride preferentially forms the monoester in which the unreacted polycarboxylic acid is soluble, rather than the diester in which the acid is insoluble. However this solution to the problem does not apply in the case of nonanhydride-forming aryl polycarboxylic acids such as isophthalic acid.

As previously stated the pressures and temperatures employed in Step I of the process of the present invention are critical. Temperatures of 350° F. to 550° F. and preferably from 430° F. to 500° F. and pressures of 50 to 300 p.s.i.g. and preferably from 85 to 150 p.s.i.g. are employed. The reaction mixture is held under these conditions until equilibrium is substantially reached as indicated by a marked reduction in the rate of evolution of water of reaction, which generally occurs within ½ to 10 hours, and more often within 1 to 4 hours. At equilibrium no more water of reaction is evolved. After equilibrium has been reached or has substantially been reached the esterification is continued until the reaction mixture has the desired acid number.

During the reaction a solvent can optionally be employed in minor amounts up to about 20 weight percent in order to inhibit sublimation of the aryl polycarboxylic acid. Suitable solvents are those having a vapor pressure greater than the reaction vessel internal pressure at the temperature employed, such as bis(2-ethoxyethyl)ether commercially available as diethyl Carbitol. The viscosity of the final product can be adjusted by the use of diethyl Carbitol as well as the more volatile solvents examples of which include among others methanol, ethanol, isopropanol, t-butanol, water, and 2-butoxyethanol.

The monocarboxylic acids useful in the present invention are well-known in the alkyd resin art and in general are the saturated and unsaturated, aryl and fatty monocarboxylic acids of 7 to 22 carbon atoms. Examples of suitable fatty monocarboxylic acids include among others enanthic, myristic, palmitic, stearic, palmitoleic, oleic, linoleic, caprylic, capric, lauric, linolenic, eleostearic, and ricinoleic acids. These and other suitable fatty monocarboxylic acids are commercially available or can be derived by well-known procedures from petroleum oils or from naturally occurring oils which include, among others, linseed, tung, castor, dehydrated castor, safflower, soya, tall, cottonseed, olive and cocoanut oils. The aryl monocarboxylic acids which can be employed in the present invention include among others benzoic acid, tertiary butyl benzoic acid, meta hydrobenzoic acid and salicyclic acid.

The polyols which can be employed in the present invention are likewise well-known in the alkyd resin art and include among others the dihydric alcohols and in particular the saturated aliphatic dihydric alcohols such as ethylene glycol, propylene glycol, 1,3-butanediol and 1,5-pentanediol, as well as the trihydric alcohols such as glycerol, trimethylolethane, trimethylolpropane, and the higher alcohols such as pentaerythritol and sorbitol. As is well-known in the art the polyol must comprise at least about 10 to 100% of a polyol having 3 or more hydroxyl groups.

The proportion of reactants is well-known in the alkyd resin art and in general aryl polycarboxylic acid is present in a weight ratio of the aryl polycarboxylic acid to the fatty acid from 5:1 to 1:20, and the polyol is present in an amount substantially stoichiometrically equivalent to the aryl acid and the fatty acid. Thus for example 1 mole of a triol would be employed with an acid mixture consisting of 1 mole of a monocarboxylic fatty acid and 1 mole of an aryl dicarboxylic acid. The adjustment of these ratios within the broad limits specified is well-known in alkyd resin art, and need not be further explained here.

Standard commercially available reaction vessels can be employed in the practice of the present invention in batch processes. Such a vessel is one capable of withstanding the specified internal pressures and which is provided with a stirrer, a thermometer, a pressure gauge, a control valve containing vapor outlet line, a heating means and an inert gas inlet. The water of reaction which is produced under the conditions specified forms steam, which together with other vapors is bled off by manipulation of the control valve in order to maintain the pressure within the specified limits. The vessel can be fitted with a condenser to condense and measure the water vapor as a control means to determine when equilibrium has substantially been reached. The present invention can also be practiced in a continuous process by the use of commercially available equipment well within the skill of the art.

The alkyd resins produced by the process of the present invention and especially those having an acid number above 50 can be rendered water dispersbile by neutralizing them with an organic or inorganic base. In general sufficient base is added to give the neutralized resin a pH of 7 to 10 and preferably 7 to 8. Examples of inorganic bases include among others the metal oxides and hydroxides such as sodium hydroxide, calcium oxide, calcium hydroxide, and ammonia in an anhydrous or aqueous media. The organic bases include among others the amines of which the tertiary amines are preferred. Primary and secondary amines can be used but are less preferred because they form amides with the carboxyl groups in the resin. In time these amides darken, giving an undesirable color to the cured film. Examples of suitable tertiary amines include among others trimethylamine, triethylamine, and dimethylethanolamine.

The alkyd resins produced by the process of the present invention can be modified physically and/or chemically by the addition of agents such as pigments, extenders, plasticizers, ultraviolet light stabilizers, solvents, drying oils, coloring agents, pacifiers, release agents, and lubricants. The composition of the present invention can be employed as coatings for substrates such as wood ceramic, ferrous metals, non-ferrous metals, and the like. When applied to a substrate by such procedures as dipping, brushing, or spraying, these compositions can be used to protect the coated substrate from the adverse effects of weather, water, air and abrasion. Thus, such useful objects as wooden and metal, boats, lawn chairs, houses, and the like, can be advantageously coated with these compositions.

The invention may be better understood by reference to the following examples in which all parts and percentages are by weight unless otherwise indicated. The operative examples are illustrative of certain embodiments designed to teach those skilled in the art how to practice the invention and to represent the best mode contemplated for carrying out the invention, and are not intended to limit the scope of the invention in any manner.

EXAMPLE 1

This example illustrates the hydrolysis of cocoanut oil to form coco fatty acids useful in the process of the present invention.

Cocoanut oil is hydrolyzed with water and hydrogenated according to procedures well-known in the art. The reaction product consists of coco fatty acids of the following composition having a saponification value of 200 and an iodine value of 9:

| Acid: | Percent |
| --- | --- |
| Lauric | 47 |
| Myristic | 18 |
| Capric | 8 |
| Caprylic | 7 |
| Palmitic | 7 |
| Stearic | 4 |
| Oleic | 8 |
| Linoleic | 1 |
| | 100 |

EXAMPLE 2

This example illustrates the synthesis of an alkyd resin according to the present invention.

The indicated quantities of the following reactant are placed in an open, sealable, reaction vessel which is capable of withstanding internal pressures of 350 p.s.i.g. and which is provided with a stirrer, a thermometer, a pressure gage, a control valve containing vapor outlet line, and an inert gas inlet.

| Reactant: | Quantity in grams |
| --- | --- |
| Coco fatty acids of Example 1 | 1713 |
| Benzoic acid | 340 |
| Glycerol | 1154 |
| Isophthalic acid | 2073 |
| Bis(2-ethoxyethyl)ether | 190 |
| Total | 5470 |

The vessel is then closed and heated to 450° F. for 2½ hours while maintaining the internal pressure between 95 and 110 p.s.i.g. by manipulation of the control valve to bleed off vapor, which consists chiefly of water of reaction formed by the esterification of the glycerol and the isophthalic acid. The temperature is then reduced to 280° F., the control valve opened completely reducing the internal pressure to zero p.s.i.g., and the reaction vessel sparged with nitrogen gas for 90 seconds. At this point the reaction mixture is cloudy and has an acid number of 115. Heat is again applied raising the temperature of the reaction mixture to 410° F. where it is maintained for a period of time under atmospheric pressure. One hour after raising the temperature the hot reaction mixture becomes clear. It is also clear when cooled to room temperature (68° F.). It has an acid number of 61. Heating is continued for an additional 50 minutes. The reaction mixture is then cooled to room temperature (68° F.) and diluted with t-butanol to a nonvolatile content of 70.2%. The resultant mixture has an acid number of 46.0 and a viscosity of 104.0 stokes. When this mixture (1043 g.) is neutralized by mixing it with t-butanol (15 g.), deionized water (374 g.) and dimethyl ethanolamine (48 g.), the resultant clear compatible mixture is 50.0% non-volatile, has a viscosity of 34.5 stokes, a pH of 7.6 and a Gardner color of 6–7.

A 0.003 inch film from a mixture of the above resin solution (70 pts.) and a water soluble melaminformaldehyde resin RI 2027 available from the Monsanto Chemical Co. (30 pts.) was applied to a glass substrate and cured 30 mins. at 250° F. The cured film has excellent, hardness, mar-resistance, alkali resistance, and organic solvent resistance.

EXAMPLE 3

This example, which is not illustrative of the present invention, is set forth for comparison.

The indicated quantities of the following reactants are placed in a three-neck flask which is provided with a stirrer, a thermometer, a reflux condenser and a Dean-Stark water separation trap.

| Reactant: | Quantity in grams |
| --- | --- |
| Coco fatty acids of Example 1 | 453 |
| Benzoic acid | 90 |
| Glycerol | 205 |
| Isophthalic acid | 548 |
| Bis(2-ethoxyethyl)ether | 50 |
| Total | 1446 |

The vessel is then heated to 430° F., for a period of time while removing water of reaction. The reaction mixture does not become clear at the reaction temperature until 6 hours after commencement of heating at which time it has an acid number of 54.0. Heating is then continued for an additional hour. The reaction mixture is then cooled to room temperature (68° F.) and diluted with 2-butoxyethanol to a nonvolatile content of 68.5%. The resultant mixture has an acid number of 50, a viscosity of 27.0 stokes, and a Gardner color of 4.

EXAMPLE 4

This example illustrates the synthesis of an alkyd resin according to the present invention employing trimethylolethane as the polyhydric alcohol.

The indicated quantities of the following reactants are placed in the reaction vessel of Example 2.

| Reactant: | Quantity in grams |
|---|---|
| Coco fatty acids of Example 1 | 1713 |
| Benzoic acid | 340 |
| Trimethylolethane | 1550 |
| Isophthalic acid | 2073 |
| Bis(2-ethoxyethyl)ether | 200 |
| Total | 5876 |

The vessel is then closed and heated to 450° F. for 2½ hours while maintaining the internal pressure between 100 and 110 p.s.i.g. by manipulation of the control valve to bleed off vapor. The temperature is then reduced to 220° F., and the control valve opened reducing the internal pressure to zero p.s.i.g. Heat is again applied raising the temperature of the reaction mixture to 280° F. At this point the reaction mixture is cloudy and has an acid number of 82. One and one half hours after raising the temperature to 400° F., the hot reaction mixture becomes clear. It is also clear when cooled to room temperature (68° F.). It has an acid number of 64. Heating is continued for an additional hour and ten minutes. The reaction mixture is then cooled to room temperature 68° F. and diluted with t-butanol to a nonvolatile content of 69.5%. The resultant mixture has an acid number of 48.6, a viscosity of 19.0 stokes and a Gardner color of 3–4.

EXAMPLE 5

This example which employs trimethylolethane and which is not illustrative of the present invention is set forth for comparison.

The indicated quantities of the following reactants are placed in a flask similar to that of Example 3.

| Reactant: | Quantity in grams |
|---|---|
| Coco fatty acids of Example 1 | 453 |
| Benzoic acid | 90 |
| Trimethylolethane | 410 |
| Isophthalic acid | 549 |
| Bis(2-ethoxyethyl)ether | 60 |
| Total | 1562 |

The vessel is then heated to 450° F. while removing water of reaction until the reaction mixture becomes clear which requires 4¼ hours. At the end of this time the reaction mixture is cooled and diluted with 2-butoxyethanol to a nonvolatile content of 70.8%. The resultant diluted mixture has an acid number of 38.6, a viscosity of 64.0 stokes, and a Gardner color of 2–3.

The diluted mixture (179.0 gm.) is mixed with 2-butoxy ethanol (142 gm.), triethyl amine (86 gm.) and water (529 gm.) and stirred rapidly whereupon a very cloudy, incompatible mixture results.

EXAMPLE 6

This example illustrates the synthesis of an alkyd resin according to the present invention employing trimethylolpropane. The indicated quantities of the following reactants are placed in a reaction vessel similar to that used in Example 2.

| Reactant: | Quantity in grams |
|---|---|
| Coco fatty acids of Example 1 | 1713 |
| Benzoic acid | 340 |
| Trimethylolpropane | 1690 |
| Isophthalic acid | 2073 |
| Bis(2-ethoxyethyl)ether | 200 |
| Total | 6016 |

The vessel is then closed and heated to 450° F. for 2½ hours while maintaining the internal pressure between 100 and 110 p.s.i.g. by manipulation of the control valve to bleed off vapor. The temperature is then reduced to 360° F., the control valve opened completely reducing the internal pressure to zero p.s.i.g. At this point the reaction mixture is clear at 360° F. but cloudy at 68° F. and has an acid number of 82.5. Heat is again applied raising the temperature of the reaction mixture to 400° F. where it is maintained for a period of time. One hour after raising the temperature the reaction mixture becomes clear at 68° F. It has an acid number of 56.7. Heating is continued for an additional 40 minutes. The reaction mixture is then cooled to room temperature (68° F.) and divided into two equal parts. One part is diluted with t-butanol to a nonvolatile content of 69.0%. The resultant clear compatible mixture has an acid number of 48.0, a viscosity of 35.0 stokes and a Gardner color of 3–4. The second part is diluted with 2-butoxyethanol to a nonvolatile content of 69.5%. The resultant clear, compatible mixture has an acid number of 48.0, a viscosity of 17.5 stokes, and a Gardner color of 3–4.

The second part (1440 g.) is neutralized by mixing it with deionized water (491 g.) and dimethylethanolamine (69 g.). The resultant clear compatible mixture has a nonvolatile content of 50.4%, a viscosity of 12.0 stokes, a Gardner color of 3 and a pH of 7.4.

EXAMPLE 7

This example, which employs trimethylolpropane and which is not illustrative of the present invention, is set forth for comparison.

The indicated quantities of the following reactants are placed in a flask similar to that of Example 3.

| Reactant: | Quantity in grams |
|---|---|
| Coco fatty acids of Example 1 | 453.0 |
| Benzoic acid | 90.0 |
| Isophthalic acid | 549.0 |
| Trimethylolpropane | 442.5 |
| Bis(2-ethoxyethyl)ether | 60.0 |
| Total | 1,594.5 |

The vessel is then heated to 440° F. for ten hours. The resultant reaction mixture has an acid number of 40.7 is clear at 440° F. but cloudy at room temperature (68° F.). When 2-butoxyethanol (450 gm.) is added to the above reaction mixture the resultant mixture is very cloudy and incompatible.

EXAMPLE 8

The procedure of Example 2 is repeated using the same reactants, times and conditions except that after the vessel is closed it is heated to 350° F. instead of 450° F. and the pressure is maintained at 50 p.s.i.g. instead of 95 to 110 p.s.i.g.

The final product exhibits a similar acid number, viscosity and color. A cured film has advantageous properties.

EXAMPLE 9

The procedure of Example 2 is repeated using the same reactants, times and conditions except that after the vessel is closed it is heated to 550° F. instead of 450° F. and the pressure is maintained at 300 p.s.i.g. instead of 95 to 110 p.s.i.g.

The final product exhibits a similar acid number, viscosity and color. A cured film has advantageous properties.

Although the invention has been described in considerable detail with reference to certain embodiments thereof, it will be understood that variations and modifications can be effected within the spirit and scope of the invention as described above and as defined in the appended claims.

What is claimed is:

1. A process for producing a monocarboxylic acid-modified alkyd resin composition comprising the steps of:
   (I) contacting at 350° F. to 550° F. at 50 to 300 p.s.i.g. in the presence of water of reaction a reaction mixture consisting essentially of:
      (A) isophthalic acid, (B) a monocarboxylic acid of 7 to 22 carbon atoms, and
(C) a polyhydric alcohol wherein the weight ratio of $A:B$ is from 5:1 to 1:20 and wherein C is present in an amount substantially stoichiometrically equivalent to A and B and wherein at least a portion of C consists of a polyhydric alcohol having more than 2 hydroxyl groups, for a period of time of ½ to 10 hours, to esterify the reaction mixture until equilibrium has been substantially reached and then (II) further esterifying the reaction mixture at atmospheric pressure and at a temperature of 220°–600° F. to produce a monocarboxylic acid-modified alkyd resin.

2. The process of claim 1 wherein 5 to 100 weight percent of said polyhydric alcohol is a trihydric alcohol selected from the group consisting of glycerol, trimethylolethane and trimethylolpropane.

3. The process of claim 1 wherein the alkyd resin has an acid number of at least 40 further comprising the step of neutralizing the resin with a base.

References Cited

UNITED STATES PATENTS

| | | | |
|---|---|---|---|
| 2,181,893 | 12/1939 | Hopkins et al. | 260—22 |
| 3,185,668 | 5/1965 | Meyer et al. | 260—75 |
| 3,329,634 | 7/1967 | McWhorter et al. | 260—22 |
| 3,367,894 | 2/1968 | Bruggeman | 260—22 |

DONALD E. CZAJA, Primary Examiner

R. W. GRIFFIN, Assistant Examiner

U.S. Cl. X.R.

117—124, 161, 167; 260—21, 29.2, 32.4, 32.6, 33.2, 33.4, 76